US012197348B2

(12) United States Patent
Wang

(10) Patent No.: US 12,197,348 B2
(45) Date of Patent: Jan. 14, 2025

(54) METHOD AND SYSTEM FOR UPLOADING DATA IN REAL TIME DATA VIA USB VIRTUAL SERIAL PORT AND USB HOST

(71) Applicant: NANJING QINHENG MICROELECTRONICS CO., LTD., Nanjing (CN)

(72) Inventor: Chunhua Wang, Nanjing (CN)

(73) Assignee: NANJING QINHENG MICROELECTRONICS CO., LTD., Nanjing (CN)

( * ) Notice: Subject to any disclaimer, the term of this patent is extended or adjusted under 35 U.S.C. 154(b) by 0 days.

(21) Appl. No.: 18/546,370

(22) PCT Filed: May 10, 2022

(86) PCT No.: PCT/CN2022/092048
§ 371 (c)(1),
(2) Date: Aug. 14, 2023

(87) PCT Pub. No.: WO2023/142301
PCT Pub. Date: Aug. 3, 2023

(65) Prior Publication Data
US 2024/0411708 A1    Dec. 12, 2024

(30) Foreign Application Priority Data

Jan. 29, 2022   (CN) .......................... 202210110028.5

(51) Int. Cl.
*G06F 13/10* (2006.01)
*G06F 13/38* (2006.01)
(Continued)

(52) U.S. Cl.
CPC .......... *G06F 13/105* (2013.01); *G06F 13/385* (2013.01); *G06F 13/4072* (2013.01);
(Continued)

(58) Field of Classification Search
None
See application file for complete search history.

(56) References Cited

U.S. PATENT DOCUMENTS 5,881,142 A * 3/1999 Frankel ................. H04M 1/715
379/171
6,633,933 B1 * 10/2003 Smith .................... G06F 3/0677
710/72
(Continued)

FOREIGN PATENT DOCUMENTS

CN    101815014 A    8/2010
CN    113326093 A    8/2021

*Primary Examiner* — Henry Tsai
*Assistant Examiner* — Aurangzeb Hassan
(74) *Attorney, Agent, or Firm* — CBM PATENT CONSULTING, LLC

(57) ABSTRACT

A method and system for uploading data in real time via a USB virtual serial port, and a USB host includes: creating a receiving thread, and presetting a plurality of USB transactions being USB BULK IN packets, and a length requested to be uploaded, submitting the plurality of USB transactions to a USB host driver, and when the receiving thread receives a returned data packet, transmitting the returned data packet to a serial port application layer buffer, immediately applying for a new USB transaction, and submitting the new USB transaction to the USB host driver; and executing, a USB transaction ranked first in a USB transaction queue, when data sent by a USB device is received and the data meets the batch endpoint size, ending the USB transaction and returning a data packet to the receiving thread, and immediately executing next USB transaction in the USB transaction queue.

9 Claims, 7 Drawing Sheets

(51) Int. Cl.
  *G06F 13/40*     (2006.01)
  *G06F 13/42*     (2006.01)
(52) U.S. Cl.
  CPC .. *G06F 13/4282* (2013.01); *G06F 2213/0042* (2013.01); *G06F 2213/0058* (2013.01)

(56) References Cited

U.S. PATENT DOCUMENTS

| | | | | |
|---|---|---|---|---|
| 6,965,955 | B1* | 11/2005 | Nishiyama | G06F 3/1236 710/72 |
| 2003/0045316 | A1* | 3/2003 | Tjong | H04L 12/4633 455/523 |
| 2004/0025099 | A1* | 2/2004 | Aikawa | H04L 1/1685 714/748 |
| 2007/0081486 | A1* | 4/2007 | Koide | H04W 52/0254 370/328 |
| 2008/0147909 | A1* | 6/2008 | Zhang | G06F 13/102 710/24 |
| 2009/0019187 | A1* | 1/2009 | Okuma | H04L 67/63 710/9 |
| 2009/0061838 | A1* | 3/2009 | Lin | G06F 9/54 455/418 |
| 2009/0172210 | A1* | 7/2009 | Kesselman | H04L 47/805 710/16 |
| 2009/0222841 | A1 | 9/2009 | Mirajkar et al. | |
| 2011/0047303 | A1* | 2/2011 | Saito | G06F 3/0673 710/39 |
| 2011/0219163 | A1* | 9/2011 | Beadnell | G06F 13/36 710/315 |
| 2012/0266206 | A1* | 10/2012 | Kao | H04N 21/43632 725/133 |
| 2013/0132618 | A1* | 5/2013 | de Goede | G06F 13/26 710/48 |
| 2014/0241206 | A1* | 8/2014 | Wang | H04W 4/18 370/254 |
| 2015/0242355 | A1* | 8/2015 | Dhandapani | G06F 13/385 710/13 |
| 2015/0331821 | A1* | 11/2015 | Liston | H04L 12/10 710/106 |
| 2017/0371681 | A1* | 12/2017 | Kulkarni | G06F 13/38 |
| 2018/0181364 | A1* | 6/2018 | Gupta | G06F 3/165 |
| 2020/0050574 | A1* | 2/2020 | Vajravel | G06F 9/45558 |

* cited by examiner

METHOD AND SYSTEM FOR UPLOADING DATA IN REAL TIME DATA VIA USB VIRTUAL SERIAL PORT AND USB HOST

TECHNICAL FIELD

The present invention belongs to the technical field of data communication, and more particularly, relates to a method and system for uploading data in real time via a USB virtual serial port, and a USB host.

BACKGROUND

With the continuous progress of science and technology, interfaces on computers get smaller and faster. As for UART serial ports still widely used in electronic products, the UART serial ports are basically not integrated due to the reasons of serial port socket volume, communication speed and the like. Expansion is mainly performed through the existing widely popular PC bus interfaces USB/PCI/E. Due to the advantages of hot swap characteristic and the number of USB ports, a USB virtual serial port becomes a main mode for expanding the serial ports, but the communication rate of USB full-speed (12M) and high-speed (480M) is at least thousands of times different from the baud rate of the serial port (9600/115200). Many applications still keep this requirement for serial port data interval, which brings challenges to the compatibility of the USB virtual serial port.

The low speed of the serial port may result in long transfer time of each byte, such as 115,200 bps which is commonly used, about 11 bytes in 1 ms, and about 6 ms for receiving 64 bytes. In the case of 9,600 bps, it takes 1 ms for about 1 byte, and it takes 64 ms for receiving 64 bytes.

USB communication mechanisms are all initiated by a USB host, and a USB slave cannot initiate communication actively, and high-speed communication is ensured by timing frame plus various transfer types, as well as bulk transfer form (BULK) plus limited bandwidth. For example, the USB is at full speed, the bandwidth of every 1 ms batch endpoint will be limited to 1,023 bytes. For USB transfer, the transfer speed is guaranteed in bulks, and each bulk transfer is based on the endpoint size of Bulk. As shown in FIG. 1, the USB host initiates a 640-byte request, and the USB transfer will be split into multiple packets, and executed, wherein 640 bytes=10*64, so 10 packets of 64-byte endpoint size will be disassembled. After the USB transaction has collected all the 640-byte data, a request is replied to the USB host. FIG. 2 is a scenario in which the endpoint size is set to 32 bytes. The USB host initiates a 320-byte request, and the USB transfer will be split into multiple packets, wherein 320 bytes=10*32. Therefore, 10 packets with 32-byte endpoint size will be disassembled, and a request will be replied to the USB host after the USB transaction has collected all the 320-byte data.

There are several difficulties in realizing functions of the USB virtual serial port:
1. The speed of the serial port is quite different from that of USB. The serial port transmits in byte stream, while the USB transmits USB requests and data at a fastest interval of 1 ms at full speed.
2. There is a conflict between the serial port data fragmentation and USB bulk transfer. In order to improve the timeliness of the serial port data reaching an upper layer, it is necessary for a USB virtual serial driver to frequently initiate USB BLUK IN transactions at a fastest speed to improve the real-time performance of the serial port data reaching the upper layer.
3. The real-time performance of the USB batch endpoint transfer cannot be fully guaranteed, because the bandwidth of the USB batch transfer is managed by the USB host as a whole and is out of control. In this time, if there is a device for high-speed communication, the USB BULK IN transaction cannot be initiated for a certain period of time. Moreover, the driver cannot interfere with overall planning.

SUMMARY

Object of the present invention: in order to solve the problem of poor timeliness of data transfer by a virtual serial port caused by a big difference between a serial port and a USB transfer speed and a conflict between serial port data fragmentation and USB bulk transfer in the prior art, the present invention provides a method and a system for uploading data in real time via a USB virtual serial port, and a USB host.

Technical solutions: a method for uploading data in real time via a USB virtual serial port, comprises the following steps of:

creating, by a virtual serial port driver, a receiving thread and a transmitting thread, wherein the receiving thread is preset with a plurality of USB transactions, the USB transactions are USB BULK IN packets, and a length requested to be uploaded by the USB BULK IN packet is a batch endpoint size, submitting the plurality of USB transactions to a USB host driver, and circularly executing a caching and apply step;

the caching and apply step comprising: when the receiving thread receives a returned data packet, transmitting the returned data packet to a serial port application layer buffer, immediately applying for a new USB transaction, and submitting the new USB transaction to the USB host driver; and putting, by the USB host driver, the USB transaction into a USB transaction queue, and immediately returning a pending status to the virtual serial driver; and executing, by the USB host driver, a USB transaction ranked first in a USB transaction queue, other USB transactions being pending, and circularly executing a returning and executing step;

the returning and executing step comprising: when data sent by a USB device is received and the data meets the batch endpoint size, ending the USB transaction and executing a data packet to the receiving thread, and immediately executing next USB transaction in the USB transaction queue.

Further, in the returning and executing step, the data meeting the batch endpoint size means that a length of the data reaches or is less than the batch endpoint size.

Further, a number of USB transactions preset in the receiving thread is M, the USB transaction queue comprises one USB transaction being executed and M-1 USB transactions being pending.

Further, the virtual serial port driver submits the plurality of USB transactions to the USB host driver in an asynchronous manner.

Further, the returning and executing step further comprises: when the USB host driver does not receive the data packet sent by the USB device, repeatedly executing, by the USB host driver, the USB transaction.

Further, in the caching and apply step, after the returned data packet is transmitted to the serial port application layer buffer, the application program withdraws the returned data packet from the application layer buffer.

Further, the data sent by the USB device is the data uploaded by the USB device to a USB host, and a method for uploading the data by the USB device to the USB host specifically comprises:

defining a bit timer, wherein the bit timer is set to a duration corresponding to a fixed number of bytes; decoding the duration by the serial port according to the serial port frame format, and storing the decoded duration in a FIFO queue of data received by the serial port; according to an end time of the bit timer, moving the data in the FIFO queue of data received by the serial port to a batch uploading endpoint of an uploading end, and waiting for the USB BULK IN packet executed by the USB host to withdraw the data; and after the data is withdrawn, clearing the bit timer and re-timing, and continuously uploading data.

Further, the bit timer is set as a timing duration of a length of 1.1 bytes to of a length of 1.9 bytes, and the length of 1.1 bytes to the length of 1.9 bytes are calculated according to a serial port communication baud rate.

A USB host comprises a processor, a memory and a software program stored in the memory and executable by the processor, wherein the processor, when executing the software program, is capable of realizing the method for uploading data in real time via the USB virtual serial port above.

A system for uploading data in real time via a USB virtual serial port comprises the USB host above, and a USB device, wherein the USB host and the USB device are connected through a USB virtual serial port.

Compared with the prior art, the method and system for uploading data in real time via the USB virtual serial port and the USB host provided by the present invention have the following advantageous effects:

1. Advantages of USB batch transfer are fully exerted. Batch transfer is the fastest transfer, which can transmit a large amount of data without blocking a bus. A maximum length of data packets transmitted in batch is the batch endpoint size. During each transfer transaction, one batch transfer transaction is ended on the condition that the requested length is reached or the length is less than the endpoint size, and the data packet is returned in time to ensure the maximum real-time performance. The virtual serial port driver and the host driver execute respective tasks, don't interfere with each other and don't need to wait for each other.
2. Using the preset USB BULK IN packets to form the USB transaction queue can improve an uploading efficiency of the USB device, reduce an uploading waiting interval of hardware data, improve the real-time performance of uploading, and also save a RAM required by the hardware to buffer data.
3. The length of the data packet requested to be uploaded by the USB BULK IN packet is the endpoint size, which improves a returning efficiency of the USB transaction, reduces a bandwidth occupancy rate, weakens negative impacts caused by the much lower serial port transfer rate than the USB, and a conflict between the serial port data fragmentation and the USB bulk transfer, and improves a compatibility of the USB virtual serial port. Meanwhile, the endpoint size is taken as an uploading unit, which saves a processing time of the hardware, and also avoids the need for the hardware to upload a zero-length packet to notify the end of the main USB transaction when uploading the whole packet.
4. The USB device cooperates closely with the USB host. The USB host ends one batch transfer transaction on the condition that the requested length is reached or the length is less than the endpoint size in each time, and returns the data packet in time. The USB device calculates according to the baud rate according to the timing of the bit timer, and uploads data to the endpoint when the time reaches a fixed byte length. The host and the device cooperate with each other to further maximize the real-time data transfer of the system.

1 #, 2 #, 9 #, 10 #, 15 # refer to the serial numbers of USB transactions; #1, #2, #9, #10 refer to the serial numbers of USB transfer queues.

DETAILED DESCRIPTION

The present invention will be further described below with reference to the accompany drawings and specific embodiments.

First Embodiment

A system for uploading data in real time via a USB virtual serial port comprises a USB host and a USB device, wherein the USB host and the USB device are connected through a USB virtual serial port. The USB host may be a computer, and may also be a singlechip with no restrictions on type.

Figure 4:
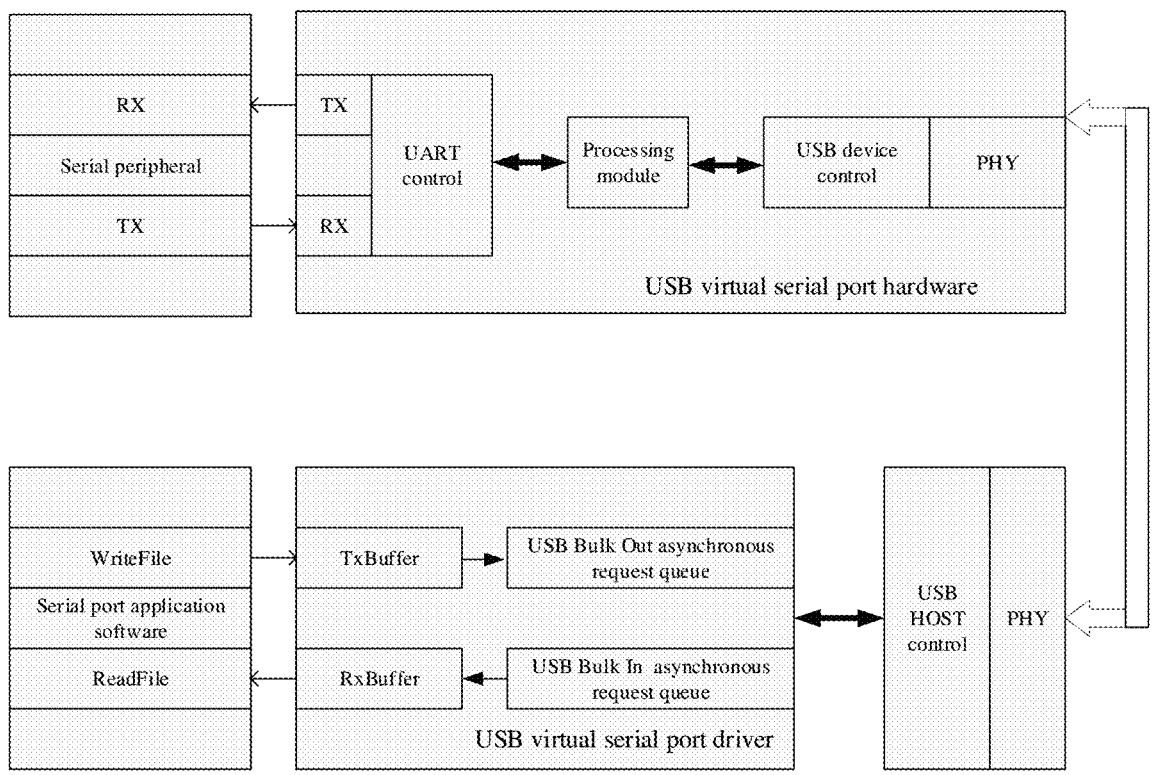
FIG. 4 is a system architecture for uploading data in real time via a USB virtual serial port according to the first embodiment.

Realization of a method for uploading data in real time via a USB virtual serial port involves the integration of a USB controller, a serial port controller and a PHY microcontroller (hereinafter referred to as hardware) and virtual serial port drivers of USB port manufacturers of computer systems, as shown in FIG. 4, comprising a serial port application, a USB virtual serial port driver, a USB host driver, USB device hardware, a serial peripheral, and the like.

Firstly, the hardware is connected to the computer through the USB, and the hardware initializes UART, the USB controller and other units.

After identifying the hardware device, the system loads the virtual serial port driver and initializes Bulk In and Bulk Out channels.

After software such as an application layer opens the serial port, the virtual serial port driver sends parameters such as a serial port baud rate to the hardware for setting through a control request.

Figure 1:
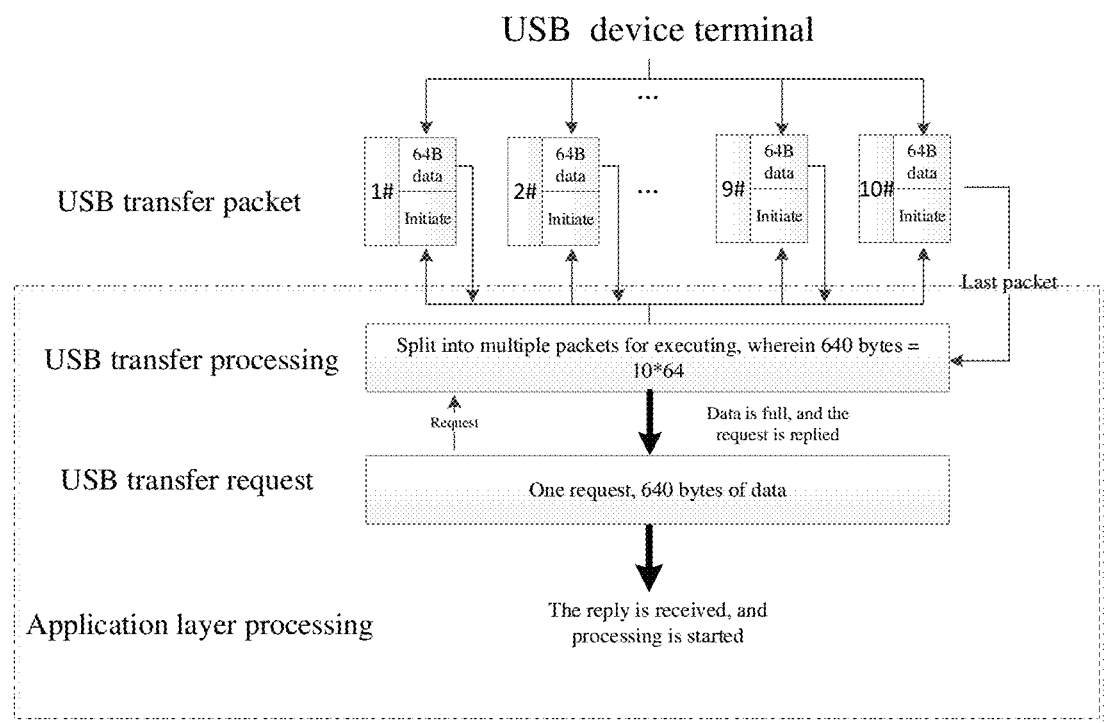
FIG. 1 is a schematic diagram of a data transfer process of an existing USB virtual serial port with an endpoint size of 64 bytes.
Figure 2:
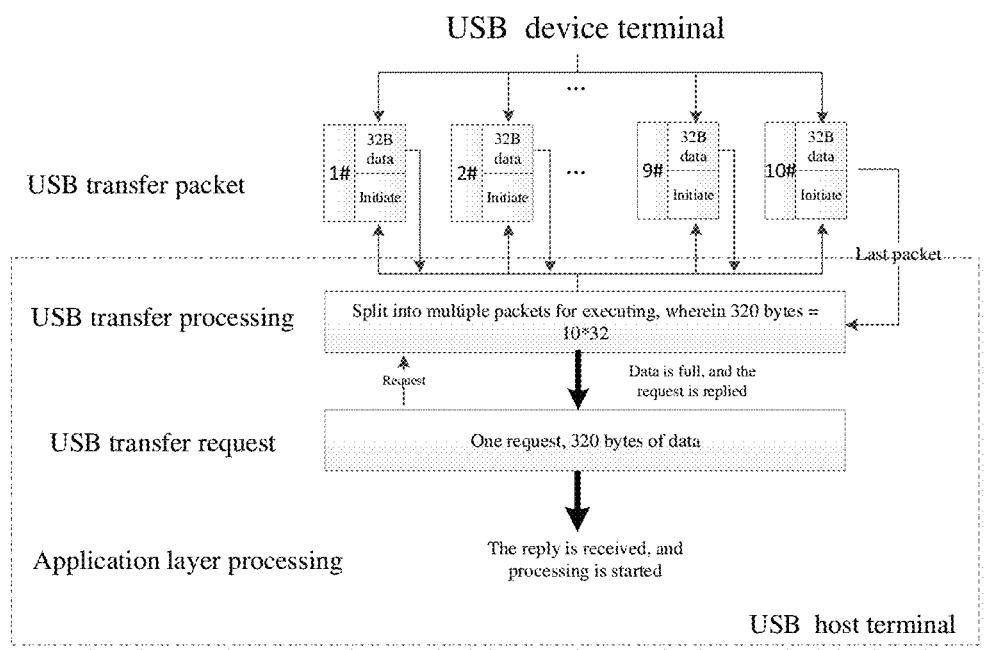
FIG. 2 is a schematic diagram of a data transfer process of an existing USB virtual serial port with an endpoint size of 32 bytes.
Figure 3:
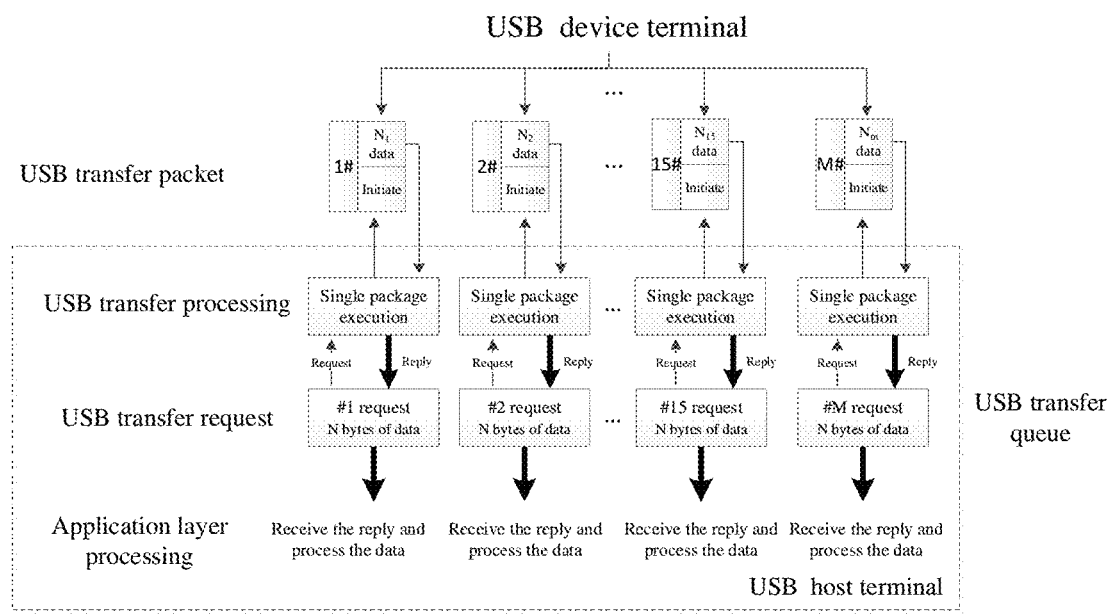
FIG. 3 is a schematic diagram of a process of uploading data in real time via a USB virtual serial port according to the present invention.

The virtual serial port driver creates a receiving thread and a transmitting thread, which are used for receiving and transmitting USB data of TX and RX. As shown in FIG. 3, M USB transactions are preset in the receiving thread, wherein the USB transactions are USB BULK IN packets, and a length requested to be uploaded by the USB BULK IN packet is a batch endpoint size N. A protocol stipulates that a full-speed USB batch endpoint should be equal to or less than 64 bytes and a high-speed USB batch endpoint should be equal to or less than 512 bytes. Therefore, in FIG. 3, N is equal to or less than 64 bytes (at full speed), or equal to or less than 512 bytes (at high speed). Once the USB transfer packet reaches or is less than N, the current transaction is ended, as shown in FIG. 3, N1, N2, N3 . . . and $N_m$ are all equal to or less than N.

Figure 5:
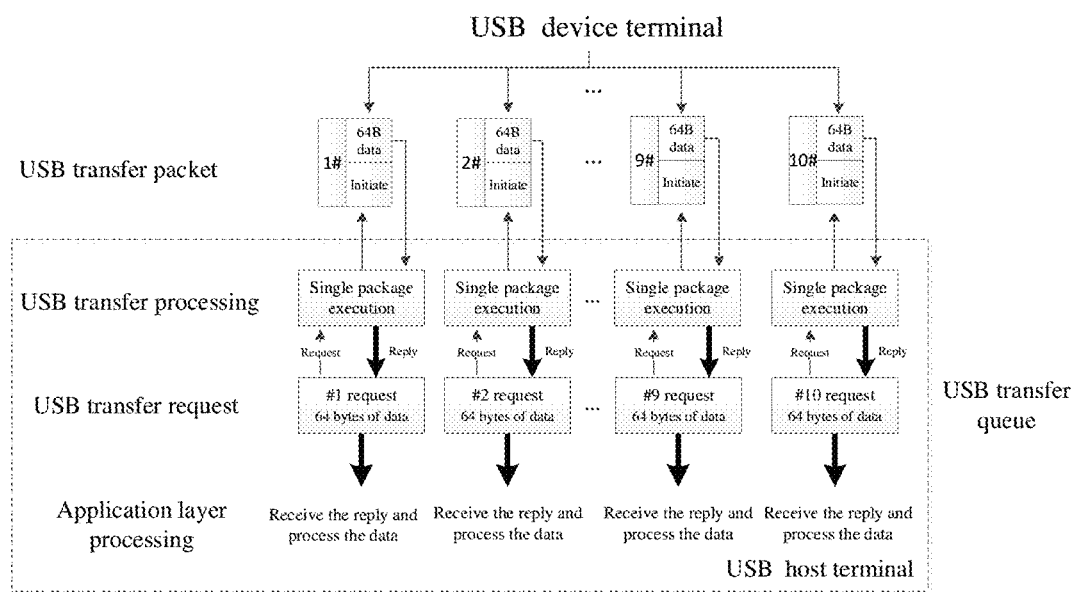
FIG. 5 is a schematic diagram of a process of uploading data in real time via a USB virtual serial port according to the first embodiment.

For example, 10 USB BULK IN packets are preset in this embodiment, and the batch endpoint size in this embodiment is 64 bytes. As shown in FIG. 5, the 10 USB BULK IN packets are submitted to the USB host driver in an asynchronous manner. This method occupies a small bandwidth, which basically guarantees that every millisecond frame will be executed. For the case that the endpoint size is equal to 64 bytes and N is 10, only 50% of the USB bandwidth is occupied at the maximum, which does not affect other transfers of the USB device. 640 bytes at the maximum can be transmitted per millisecond at full load, which can theoretically meet the continuous transfer of 6 M baud rate. The reason why the length requested to be uploaded by the USB BULK IN packet is set to the batch endpoint size is to make the host driver end the current transaction once the endpoint length is reached or the length is less than the endpoint size after receiving the data, and return data to the virtual serial port driver to improve timeliness of data uploading as much as possible. The process is shown in FIG. 5, which shows a full load situation.

Once one USB transaction is finished, the USB host driver puts next USB transaction in a USB transaction queue, and immediately returns a pending status (STATUS_PENDING) to the virtual serial port driver. These USB transactions are arranged in the USB transaction queue, and the USB host driver starts to execute a USB transaction ranked first in the USB transaction queue, while other USB transactions are pending.

If the data sent by the USB device is received after the USB transaction is executed, and the data length reaches or is less than the endpoint size, the USB transaction is immediately ended and the data packet is returned to the receiving thread, and next USB transaction in the USB transaction queue is immediately executed. The processes of executing, returning, executing and returning are circulated in this way, so as to always keep one executing USB transaction and nine pending USB transactions in the USB transaction queue.

If the hardware does not upload USB data after the USB transaction is executed, and the data required for uploading is not received, the USB host driver may repeatedly execute the USB transaction.

After the virtual serial port driver submits the USB BULK IN packet to the USB host driver, when receiving the returned data packet, the receiving thread transmits the returned data packet to a serial port application layer buffer, and immediately applies for a new USB BULK IN packet that matches the endpoint size, which is submitted to the USB host driver as a new USB transaction, so as to circularly buffer, apply, buffer and apply. The application program withdraws the data from the serial port application layer buffer. In the method for uploading data in real time via the USB virtual serial port, batch transfer is employed. During each transfer transaction, one batch transfer transaction is ended on the condition that the data length meets one endpoint size, i.e., the endpoint size is reached or the length is less than the endpoint size (when the returned data does not reach the endpoint size, the data may also return), and the data packet is returned immediately after one USB transaction is ended, which is not necessary to wait until a larger data packet is returned before uploading (when the data packet is larger, the serial port transfer takes too long, which wastes a pending time and the application program does not get the data in time), so that the application program can receive the data in time, thus improving a real-time performance of the data transfer via the virtual serial port, and greatly weakening negative impacts caused by the much lower serial port transfer rate than the USB, and a conflict between the serial port data fragmentation and the USB bulk transfer.

Moreover, the virtual serial port driver and the host driver execute respective tasks, don't interfere and affect with each other. The virtual serial driver does not need to submit a USB transaction request after the USB host driver returns the data packet, and the USB host driver may also immediately execute the pending USB transaction request in the queue after the data packet is returned, with no need to wait for the serial driver USB to apply, allocate bandwidth, and save time in queue, thus improving a data transfer efficiency of the virtual serial port.

Second Embodiment

Figure 6:
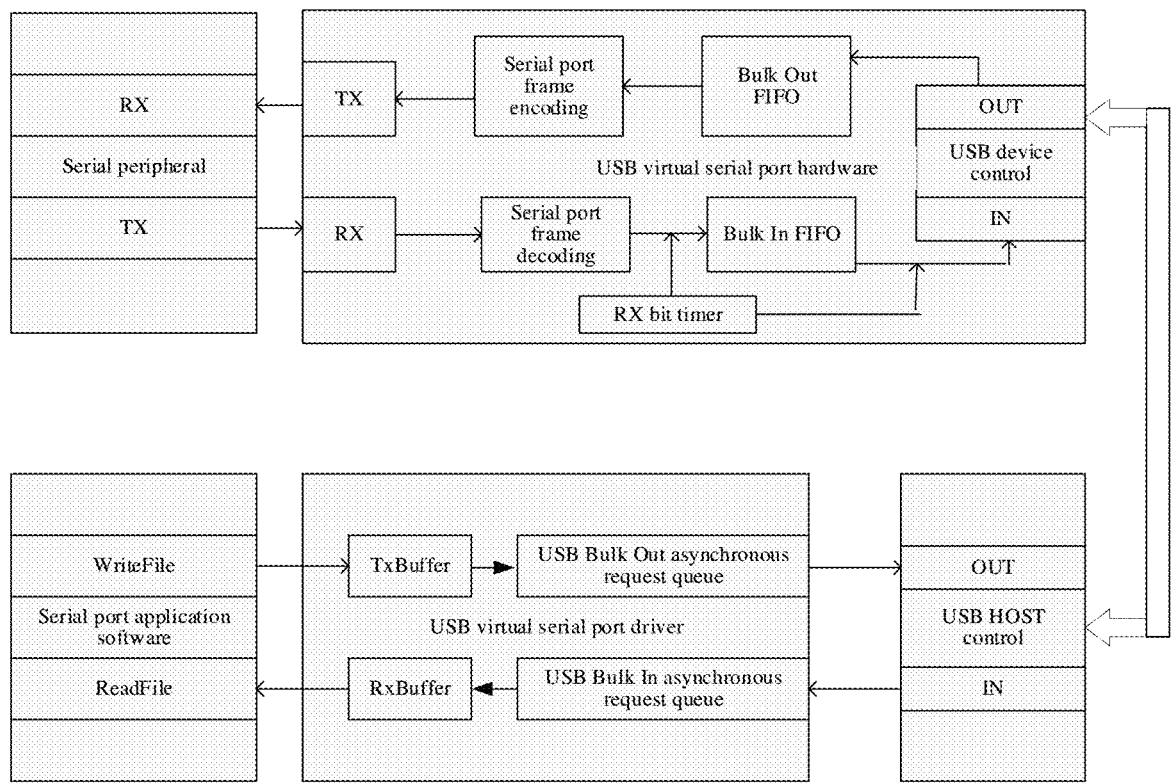
FIG. 6 is a system architecture for uploading data in real time via a USB virtual serial port according to the second embodiment.

In order to cooperate with the driver at the USB host terminal and further improve the real-time performance of data uploading, settings at the USB device terminal are added in the second embodiment on the basis of the first embodiment. As shown in FIG. 6, a bit timer is added to the USB device terminal, and the USB device terminal may continuously upload data to a BULK IN endpoint of an uploading terminal according to a duration corresponding to a fixed number of bits, instead of a fixed delay, so as to cooperate with a solution that the USB transaction executed by the host every time is the batch endpoint size, thus further reducing the pending time and further improving a real-time performance of the system.

A specific method of uploading data in real time at the USB device terminal is:

1. A bit timer is defined, wherein the bit timer is set to a duration corresponding to a fixed number of bytes; and after UART RX receives a start frame of a first serial port signal, the bit timer starts; after the serial port signal is decoded according to a serial port frame format, the serial port signal is stored in RX FIFO (FIFO queue of data received by the serial port), and pended for uploading.
2. The bit timer setting can be set to 1.1 bytes to 1.9 bytes in length, based on the pre-set baud rate calculation, and is set as a time of 1.5 bytes by default in this embodiment; and when the bit timer reaches the time corresponding to 1.5 bytes, it is queried whether there is data in RX FIFO; if so, the data is moved in RX FIFO to the BULK IN endpoint of the uploading end, and pended for an IN transaction packet executed by the host driver to withdraw the data.
3. After the data is withdrawn, the bit timer is cleared, and re-timing is started after the serial port start frame arrives.

In order to cooperate with the solution of the USB host driver, the USB device uploads data to the batch transfer endpoint of the uploading end regularly according to the time corresponding to the fixed number of bits. For different baud rates, the same byte interval can be achieved, which improves a compatibility with a native serial port and use convenience of users, further improves a real-time performance of data transfer of the system, and makes the system for uploading data in real time via the USB virtual serial port have a real-time performance as high as possible.

Third Embodiment

Figure 7:
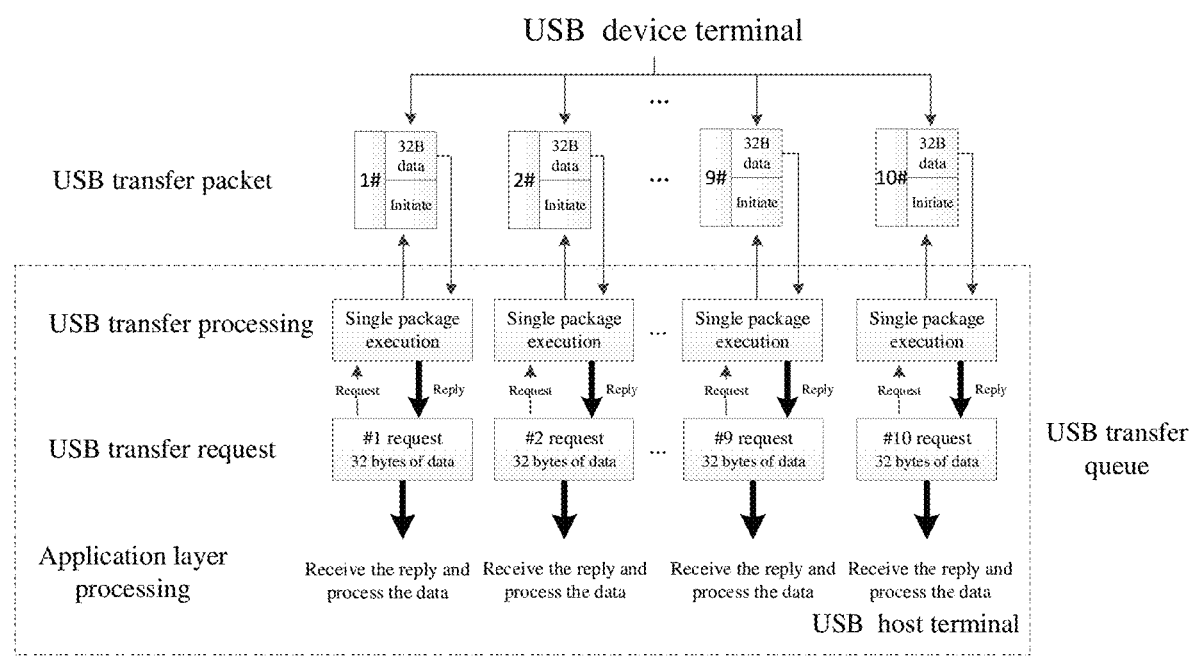
FIG. 7 is a schematic diagram of a process of uploading data in real time via a USB virtual serial port according to the second embodiment.

The difference between Embodiment 3 and Embodiment 1 or Embodiment 2 is that, as shown in FIG. 7, the USB batch endpoint size is 32 bytes. 10 USB BULK IN packets are preset in this embodiment, and the 10 USB BULK IN packets are submitted to the USB host driver in an asynchronous manner. This method occupies a small bandwidth, which basically guarantees that every millisecond frame will be executed. For the case that the endpoint size is equal to 32 bytes and N is 10, only 30% of the USB bandwidth is occupied at the maximum, which does not affect other transfers of the USB device. As shown in FIG. 7, 320 bytes at the maximum can be transmitted per millisecond at full load, which can theoretically meet the continuous transfer of 3 M baud rate.

What is claimed is:

1. A method for uploading data in real time via a USB virtual serial port, comprising the following steps of:

creating, by a virtual serial port driver, a receiving thread and a transmitting thread, wherein the receiving thread is preset with a plurality of ranked USB transactions, the plurality of ranked USB transactions are USB BULK IN packets, and a length requested to be uploaded by the USB BULK IN packet is a batch endpoint size, submitting the plurality of ranked USB transactions to a USB host driver, and circularly executing a caching and apply step;

the caching and apply step comprising: when the receiving thread receives a returned data packet, transmitting the returned data packet to a serial port application layer buffer, immediately applying for a new USB transaction, and submitting the new USB transaction to the USB host driver; and putting, by the USB host driver, a first ranked USB transaction of the plurality of ranked USB transactions into a USB transaction queue, and immediately returning a pending status to the virtual serial driver; and executing, by the USB host driver, the first ranked USB transaction of the plurality of ranked USB transactions in a USB transaction queue, rest of the plurality of ranked USB transactions being pending, and circularly executing a returning and executing step; and the returning and executing step comprising: when data sent by a USB device is received and the data meets the batch endpoint size, ending the first ranked USB transaction of the plurality of ranked USB transactions and returning a data packet to the receiving thread, and immediately executing next ranked USB transaction of the plurality of ranked USB transactions in the USB transaction queue; wherein the data meeting the batch endpoint size means that a length of the data reaches or is less than the batch endpoint size.

2. The method for uploading data in real time via the USB virtual serial port according to claim 1, wherein a number of ranked USB transactions preset in the receiving thread is M, the USB transaction queue comprises one USB transaction being executed and M-1 ranked USB transactions being pending.

3. The method for uploading data in real time via the USB virtual serial port according to claim 1, wherein the virtual serial port driver submits the plurality of ranked USB transactions to the USB host driver in an asynchronous manner.

4. The method for uploading data in real time via the USB virtual serial port according to claim 1, wherein the returning and executing step further comprises: when the USB host driver does not receive the data packet sent by the USB device, repeatedly executing, by the USB host driver, the ranked USB transaction.

5. The method for uploading data in real time via the USB virtual serial port according to claim 1, wherein in the caching and apply step, after the returned data packet is transmitted to the serial port application layer buffer, the application program withdraws the returned data packet from the application layer buffer.

6. The method for uploading data in real time via the USB virtual serial port according to claim 1, wherein the data sent by the USB device is the data uploaded by the USB device to a USB host, and a method for uploading the data by the USB device to the USB host specifically comprises:

defining a bit timer, wherein the bit timer is set to a duration corresponding to a fixed number of bytes; decoding the duration by the serial port according to the serial port frame format, and storing the decoded duration in a FIFO queue of data received by the serial port; according to an end time of the bit timer, moving the data in the FIFO queue of data received by the serial port to a batch uploading endpoint of an uploading end, and waiting for the USB BULK IN packet executed by the USB host to withdraw the data; and after the data is withdrawn, clearing the bit timer and re-timing, and continuously uploading data.

7. The method for uploading data in real time via the USB virtual serial port according to claim 6, wherein the bit timer is set as a timing duration of a length of 1.1 bytes to of a length of 1.9 bytes, and the length of 1.1 bytes to the length of 1.9 bytes are calculated according to a serial port communication baud rate.

8. A USB host, comprising a processor, a memory and a software program stored in the memory and executable by the processor, wherein the processor, when executing the software program, is capable of realizing the method for uploading data in real time via the USB virtual serial port according to claim 1.

9. A system for uploading data in real time via a USB virtual serial port, comprising the USB host according to claim 8, and a USB device, wherein the USB host and the USB device are connected through a USB virtual serial port.

* * * * *